G. & W. GEER.
AXLE MOUNTING FOR MOTOR VEHICLES.
APPLICATION FILED APR. 13, 1915.
1,214,151.
Patented Jan. 30, 1917.
3 SHEETS—SHEET 1.
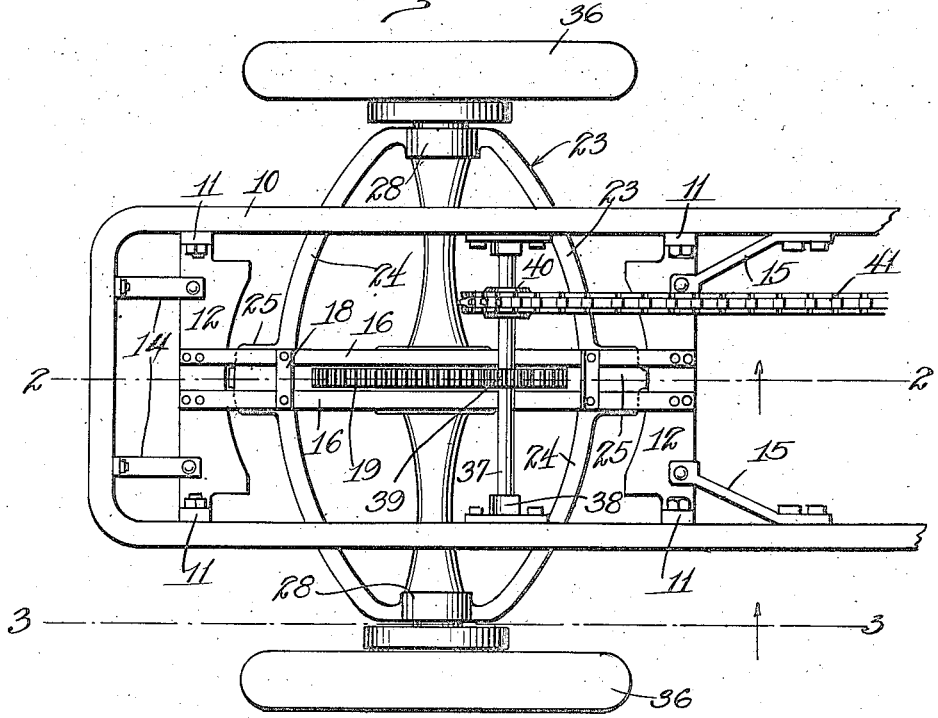
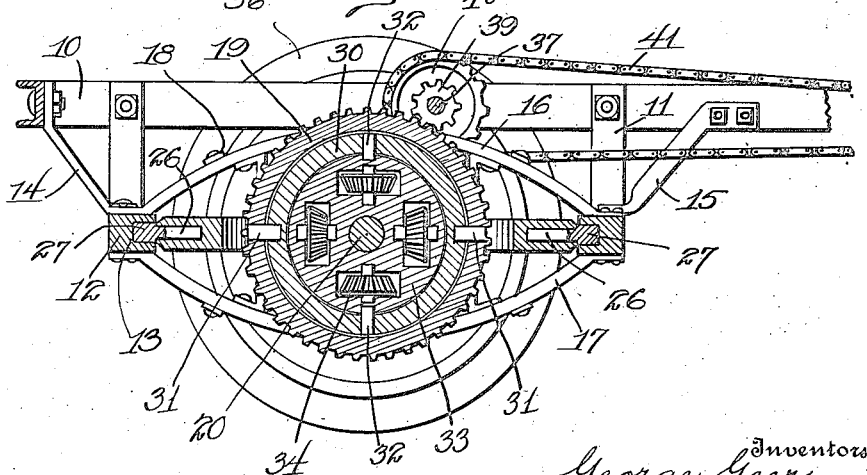
Witnesses
W. H. Mulligan
Inventors
George Geer
Wesley Geer
By Richard B. Owen
Attorney

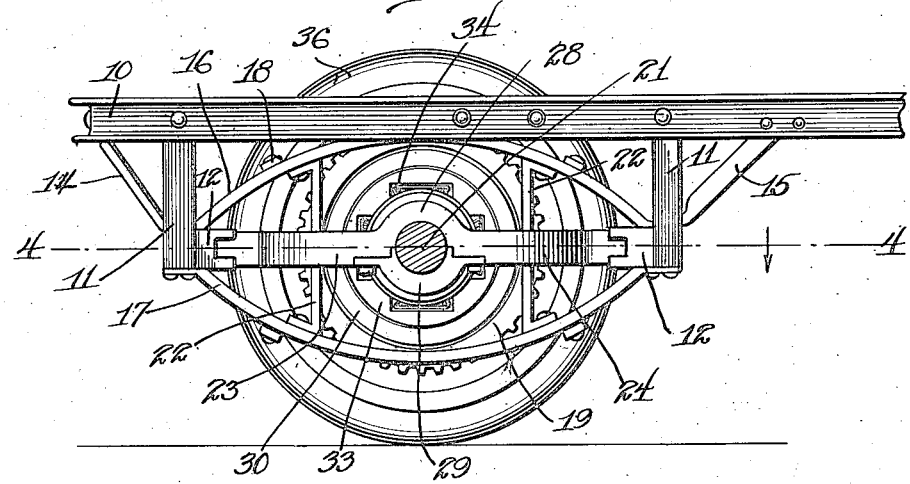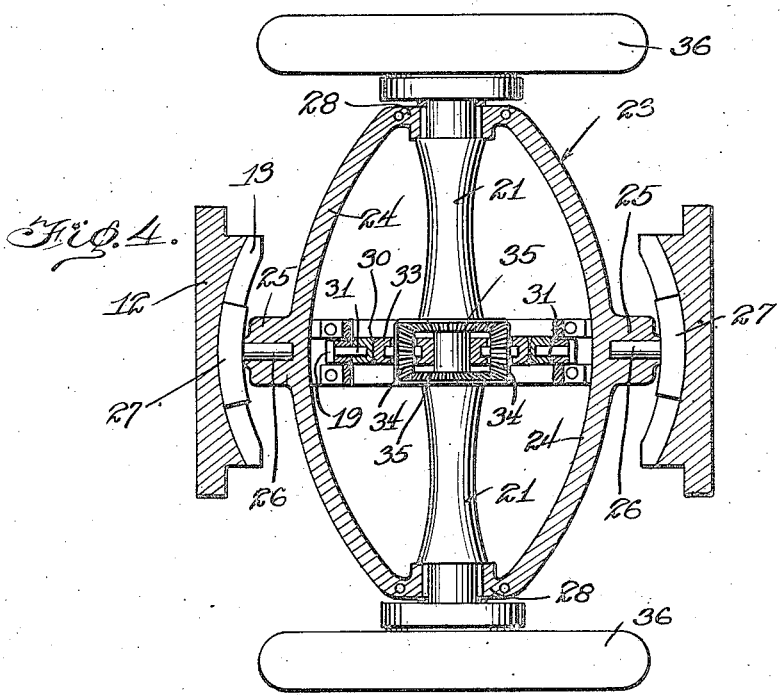

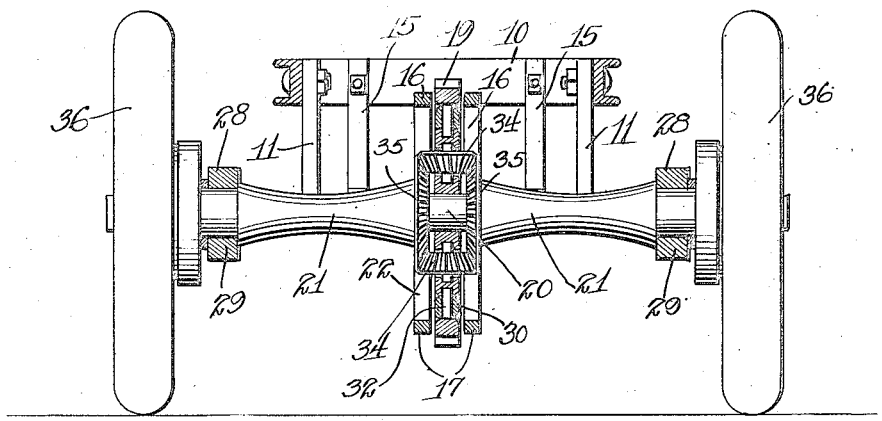
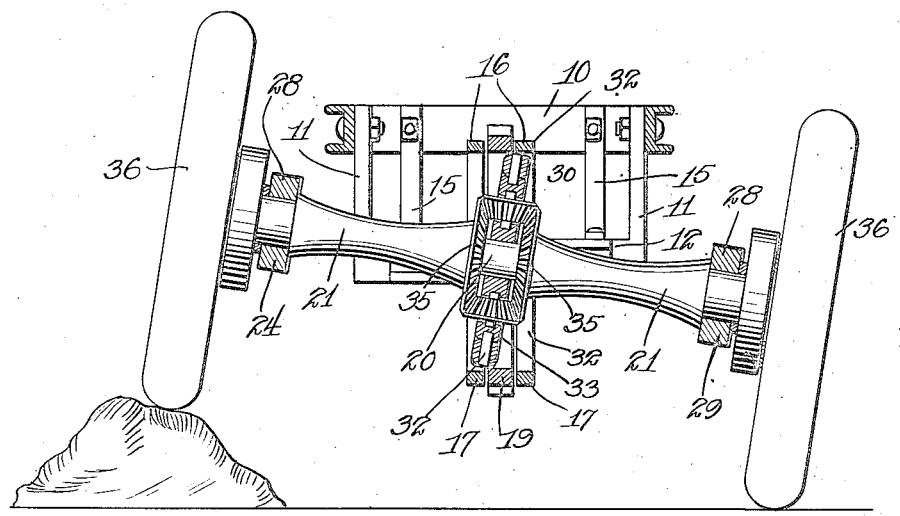

UNITED STATES PATENT OFFICE.

GEORGE GEER AND WESLEY GEER, OF VINTON COUNTY, OHIO.

AXLE-MOUNTING FOR MOTOR-VEHICLES.

1,214,151. Specification of Letters Patent. Patented Jan. 30, 1917.

Application filed April 13, 1915. Serial No. 21,105.

*To all whom it may concern:*

Be it known that we, GEORGE GEER and WESLEY GEER, citizens of the United States, residing in the county of Vinton and State of Ohio, have invented certain new and useful Improvements in Axle-Mountings for Motor-Vehicles, of which the following is a specification.

This invention relates to an axle mounting particularly adapted to the needs of traction engines or the like unusually large motor vehicles which have often proved difficult to manage, particularly over rough roads or in making turns.

One of the primary objects of the present invention relates to the provision of an axle mounting that may be applied to either end of a vehicle, and which said mounting permitting angular movement of the axle in both horizontal and vertical directions independent of the chassis, is particularly applicable in the case of a vehicle wherein all four wheels are to be driven and steered.

An object of equal importance is to provide an axle mounting of the type above set forth in which the differential housing shall be so mounted as to be capable of angular movement, in some degree, in any direction without disturbing the driving connections between the said differential and the fixedly mounted motor driven gears of the vehicle.

It is also a particular aim of this invention to provide means for pivotally mounting each axle of the vehicle with respect to the truck or common chassis supported thereby without the use of hammer bolts, fifth wheels, or the like.

The above and additional objects which will become apparent as this explanatory description proceeds are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice and throughout the several views of which like characters of reference designate similar parts: Figure 1 is a plan view of one end of a motor truck or traction engine chassis as equipped with the present invention, Figs. 2 and 3 are vertical sectional views taken on the lines 2—2 and 3—3 of Fig. 1, Fig. 4 is a horizontal sectional view taken on the line 4—4 of Fig. 3, and Figs. 5 and 6 are end sectional views showing respectively the normal and abnormal relations between the axle and the chassis.

There is illustrated one end of the chassis 10 of a motor truck or traction engine which may be provided with a body of any desired type although the present invention is particularly applicable to those varieties of these vehicles which have heretofore been found unwieldy to steer.

The chassis frame 10 is of the customary U-shape in cross section and supports through the medium of hangers 11 the transverse plate members 12, the facing edges of which are arcuately cut away from a common center equi-distant from each while the facing edges are rectangularly channeled as denoted by the numeral 13. Angular bracing arms 14 and 15 are also employed to rigidly mount the members 12. Joining the upper faces of these members are the half elliptical frame members 16 while the similar but oppositely secured framing members 17 connect the under faces of the members 12. Each of the members 16 is superimposed over one of the members 17 and the vertical pairs are spaced laterally by means of the tie plates indicated at 18 in order to provide a surrounding framing for the differential drive gear 19 which is pivotally connected to means mounted on a stub shaft 20 as will be hereinafter more fully described, such stub shaft being journaled in the hollow extremities of the divided axle 21. Vertical braces 22 connect the frame members 16 and 17 of each vertical pair while a framing to support the divided axle 21 is denoted as a whole by the numeral 23 and includes semi-elliptical side members 24 each formed at the extremity of its transverse axis with enlarged portions 25 in which there is journaled a stem 26 to mount the slidable shoe 27 within the respective channels 13 of the supporting members 12. At the extremities of the major axis of the ellipse formed by the two members 24, are bearings 28 for the outer ends of the divided axle 21, these bearings being provided with caps 29, (see Fig. 3).

It should be apparent from the foregoing that by the use of any customary or desired steering means the elliptical frame 23 may be partially rotated in a horizontal plane irrespective of the position of the chassis by the action of the shoes 27 slidable within the members 12 which rigidly depend from the chassis 10. The differential gear 19 does not partake of such turning movement being restrained by the members 16 and 17 secured to the chassis through the members 12. It is necessary therefore that the internal differential gearing controlling movement of the axles 21 should be capable of operating at any angle other than a right angle existing between these axles and the drive gear 19. Means permitting such a movement include a substantial universal joint and are illustrated in Fig. 2. The gear 19 as shown in this figure is interiorly cut away to accommodate an inner ring 30 which is slightly spaced therefrom and is pivotally connected thereto by means of the diametrically alined pins 31 which extend inwardly from the rim of the gear 19. Similar pins 32, diametrically positioned at right angles to the axial line of the pins 31 serve to mount the inner differential member 33 within the ring 30, portions of which member are cut away to accommodate the small beveled differential gears 34 in the customary manner, this latter member 33 being mounted upon the previously mentioned stub axle 20 and, accordingly, serving to mount the entire structure. It will thus be apparent that while rotation of the outer gear 19 will impart a similar movement to the inner gear carrier 33 that this latter will be permitted rotational movement in any direction without interrupting such drive.

A larger gear 35 is carried by each section of the divided axle 21 in order to mesh simultaneously with all of the beveled differential gears 34 so that forward drive will be transmitted equally to both sections of the divided axle by the interlocking of these gears except when a curve is turned, in which latter case the greater resistance incurred by the inner wheel will permit the beveled differential gears to rotate about the axis of the resisting gear 35 and permit the outer axle section 21 to rotate the faster, in the customary manner.

Since the mounting described will permit the divided axle 21 to oscillate about the central axes in both horizontal and vertical planes independently of the chassis 10, it will be apparent that upon meeting an obstruction, the present axle mounting as delineated in Fig. 6 will permit the divided axle to oscillate vertically independently of the chassis which may maintain its normally horizontal position, no interruption to the differential gear being attendant upon this movement. It will be remembered that the sliding shoes 27 are pivotally mounted with respect to the elliptical frame 23 so that vertical movement of this frame will in no wise destroy the efficacy of these shoes within the rigid members 12, while a combination of both horizontal and vertical movement will be readily permitted by the described axle mounting mechanism without the slightest strain upon any of the parts. There have been illustrated in order to make a completely assembled showing, wheels 36 provided upon the extremities of each section of the axle 21 while a shaft 37 is journaled in bearings 38 secured to appropriate points of the chassis 10 and rotatably supports a gear 39 adapted to mesh with the differential drive gear 19, such gear being driven through the medium of a sprocket 40 also keyed upon the shaft 37 and connected through the medium of a chain 41 to the engine drive mechanism in the manner usually adopted in the construction of large trucks, traction engines and the like to which the axle mounting of this last invention has been declared particularly applicable.

The advantages attendant upon the use of the present invention are obvious in view of the fact that a disclosure has been made whereby the previously presented objects are capable of being attained by the axle mounting described in the foregoing and hereinafter claimed. While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:

1. In an axle mounting for vehicles, means dependent from the chassis of a vehicle for supporting said mounting, slidable means sustained by said depending means to permit horizontal rotation of said mounting with respect to said chassis, and means carried by said sliding means permitting vertical oscillation of said mounting with respect to first said means.

2. In an axle mounting for vehicles, means including guide plates dependent from the chassis of a vehicle for supporting said mounting, shoes carried by said mounting for sliding contact with said guide plates to permit horizontal rotation of the mounting independent of said means, and means sustained by said shoes to permit vertical oscillation of said mounting independent of said chassis.

3. A divided-axle mounting for vehicles including a chassis, differential drive gearing, the primary gear of which is maintained in alinement with said chassis, an axle frame having a horizontal and a vertical independency of movement about the central perpendicular axis with respect to said chassis, and a divided axle mounted in said frame to be driven by said gear.

4. In a divided-axle mounting for vehicles, a chassis, differential drive gearing, the primary gear of which is maintained in alinement with said chassis, an axle frame, a divided axle carried by said frame and driven by said gear, and means affording said axle a horizontal and a vertical independency of movement about central axes with respect to said gear.

5. A divided-axle mounting for vehicles including a chassis, a differential drive gearing, the primary gear of which is maintained in alinement with said chassis, an axle frame, a divided axle supported in said frame and driven by said gear, and separate means affording a common vertical and horizontal independency of movement of said frame and axle about a central point with respect to said chassis.

6. A divided-axle mounting for vehicles including a chassis, a differential drive gearing, means inclosing the primary gear of said gearing to maintain the same in alinement with said chassis, a frame, a divided axle mounted in said frame and driven by said gear, means affording said frame independent rotary movement in horizontal and vertical planes relative to said chassis, and means affording a similar independency of movement to said divided axle sections with respect to said drive gear.

7. An axle mounting for vehicles including hangers dependent from the chassis of a vehicle, members supported by said hangers and provided with arcuate grooves, the continuations of which meet to form a circle, a frame concentrically mounted with said grooves, diametric enlargements carried on opposite frame members, and shoes pivoted in each enlargement for sliding contact with respective grooves in affording said frame horizontal movement independent of said chassis.

8. In an axle mounting for vehicles, hangers dependent from the chassis of a vehicle, members supported by said hangers, a frame concentrically located with respect to said members, a divided axle alinedly supported in said frame, framing members transversely spaced of said chassis in vertical pairs and joining first said members, and differential gearing coacting with the sections of said axle and inclosed by said pairs of framing members.

9. In an axle mounting for vehicles, hangers dependent from the chassis of a vehicle, members supported by said hangers, a frame concentrically located between said members, a divided axle supported in said frame, framing members spaced transversely from the center line of said chassis in vertical pairs and connecting first said members, differential gearing inclosed by said framing members and connecting the inner ends of said axle sections, and means rotatably supporting said frame with respect to said members.

10. In an axle mounting for vehicles, hangers dependent from the chassis of a vehicle, members supported by said hangers, a frame concentrically located between said members, a divided axle supported in said frame, framing members spaced transversely from the center line of said chassis in vertical pairs and connecting first said members, differential gearing inclosed by said framing members and connecting the inner ends of said axle sections, and shoes connected to said frame and slidable within first said members to rotatably and pivotally support said frame with respect to said chassis.

11. In an axle mounting for vehicles, a chassis, hangers dependent therefrom, members supported by said hangers and provided with arcuate grooves, the continuations of which meet to form a circle, an axle frame located concentrically of said members, a divided axle supported in said frame, a stub shaft journaled in the inner extremities of said axle sections, a disk gear carrier mounted on said stub shaft, a differential drive gear connected to said carrier by a substantially universal joint, means carried by said frame for slidable engagement with said members, and means connecting said members to inclose said differential drive gear.

12. In an axle mounting for vehicles, a chassis, hangers dependent therefrom, members supported by said hangers and provided with grooves, the continuations of which meet to form a circle, a frame concentrically mounted with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, and means rotatably supporting said frame with respect to said members.

13. In an axle mounting for vehicles, a chassis, hangers dependent therefrom, members supported by said hangers and provided with grooves, the continuations of which meet to form a circle, a frame concentrically rotated with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, and shoes diametrically alined on said frame and slidable in said grooved members to rotatably support said frame independent of said chassis.

14. In an axle mounting for vehicles, a chassis, hangers dependent therefrom, members supported by said hangers and provided with grooves, the continuations of which meet to form a circle, a frame concentrically rotated with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, and shoes slidably mounted in said grooved members and pivotally supported at diametrically opposed points by said frame to mount the latter for vertical and horizontal rotational movement with respect to said chassis.

15. In an axle mounting for vehicles, a chassis, hangers dependent therefrom, members supported by said hangers and provided with grooves, the continuations of which meet to form a circle, a frame concentrically rotated with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, means rotatably mounting said frame with respect to said members, and means connecting said members in transversely spaced vertical pairs to surround said differential drive gear, as and for the purpose set forth.

16. In an axle mounting for vehicles, a chassis, hangers dependent therefrom, members supported by said hangers and provided with grooves, the continuations of which meet to form a circle, a frame concentrically rotated with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, shoes diametrically alined on said frame and slidable in said grooved members to rotatably support said frame independent of said chassis, and framing members joining first said members in transversely spaced vertical pairs to inclose said differential drive gear therebetween to maintain the same in alinement with said chassis without interfering with said universal joint connections.

17. In an axle mounting for vehicles, a chassis, hangers dependent therefrom, members supported by said hangers and provided with grooves, the continuations of which meet to form a circle, a frame concentrically rotated with respect to said grooves, a divided axle each section having one extremity journaled in said frame, a stub shaft joining the inner extremities of said axles, a differential gear carrier mounted on said shaft and provided with cut out portions, differential gears seated in said cut out portions, a differential drive gear having universal joint connections with said carrier, gears carried by the inner extremity of each axle section meshing with said differential gears, shoes slidably mounted in said grooved members and pivotally supported at diametrically opposed points by said frame to mount the latter for vertical and horizontal rotational movement with respect to said chassis, and framing members joining first said members in transversely spaced vertical pairs to inclose said differential drive gear therebetween to maintain the same in alinement with said chassis without interfering with said universal joint connections.

18. A divided-axle mounting for vehicles including a chassis, members dependent from said chassis and provided with arcuate grooves, the continuations of which meet to form a circle, an axle frame concentrically located between said members, a divided axle the sections of which have their outer extremities journaled in said frame, a stub shaft rotatably mounted in the inner extremities of said axle sections, a differential gear carrier mounted on said shaft and provided with cut out portions, beveled gears rotatably accommodated in said cut out portion, a spaced ring surrounding said carrier, a differential drive gear interiorly cut away to inclose said carrier and said ring, diametrical pivotal connections between said carrier, said ring and said drive gear to permit of horizontal and vertical movement of said shaft with respect to said drive gear, and means rotatably mounting said frame in the grooves of said members.

19. A divided-axle mounting for vehicles including a chassis, members dependent from said chassis and provided with arcuate grooves, the continuations of which meet to form a circle, an axle frame concentrically located between said members, a divided axle the sections of which have their outer extremities journaled in said frame, a stub shaft rotatably mounted in the inner extremities of said axle sections, a differential gear carrier mounted on said shaft and provided with cut out portions, beveled gears rotatably accommodated in said cut out portion, a spaced ring surrounding said carrier, a differential drive gear interiorly cut away to inclose said carrier and said ring, diametrical pivotal connections between said carrier, said ring and said drive gear to permit of horizontal and vertical movement of said shaft with respect to said drive gear, means spacedly inclosing said drive gear to prevent lateral movement thereof, and means engaging in the grooves of said members and pivotally connected to said frame to afford the latter the same independency of vertical and horizontal movement with respect to said chassis as given said axles.

20. A divided-axle mounting for vehicles including a chassis, members dependent from said chassis and provided with arcuate grooves, the continuations of which meet to form a circle, an axle frame concentrically located between said members, a divided axle the sections of which have their outer extremities journaled in said frame, a stub shaft rotatably mounted in the inner extremities of said axle sections, a differential gear carrier mounted on said shaft and provided with cut out portions, beveled gears rotatably accommodated in said cut out portions, a spaced ring surrounding said carrier, a differential drive gear interiorly cut away to inclose said carrier and said ring, diametrical pivotal connections between said carrier, said ring and said drive gear to permit of horizontal and vertical movement of said shaft with respect to said drive gear, upper framing members arcuately connecting first said members and transversely spaced, lower framing members similarly connecting first said members and similarly spaced to inclose said drive gear between each pair of vertical members, bracing means connecting vertical members of each pair, and maintaining the said transverse spacing, and means rotatably mounting said axle frame with respect to said members.

21. A divided-axle mounting for vehicles including a chassis, members dependent from said chassis and provided with arcuate grooves, the continuations of which meet to form a circle, an axle frame concentrically located between said members, a divided axle the sections of which have their outer extremities journaled in said frame, a stub shaft rotatably mounted in the inner extremities of said axle sections, a differential gear carrier mounted on said shaft and provided with cut out portions, beveled gears rotatably accommodated in said cut out portions, a spaced ring surrounding said carrier, a differential drive gear interiorly cut away to inclose said carrier and said ring, diametrical pivotal connections between said carrier, said ring and said drive gear to permit of horizontal and vertical movement of said shaft with respect to said drive gear, upper framing members arcuately connecting first said members and transversely spaced, lower framing members similarly connecting first said members and similarly spaced to inclose said drive gear between each pair of vertical members, bracing means connecting vertical members of each pair and maintaining the said transverse spacing, and shoes diametrically located upon said axle frame for engagement within the grooves of first said members and stems pivotally mounting said shoes with respect to said frame.

22. A divided-axle mounting for vehicles including a chassis, hangers dependent from said chassis, members supported by said hangers and provided with facing arcuate grooves, the continuations of which meet to form a circle, a frame concentrically located between said members, diametric enlargements formed on said frame, shoes slidable in respective grooves of said members and pivotally mounted in said enlargements to afford said frame horizontal and vertical independency of movement with respect to said chassis, a pair of spaced upper connecting frame members for first said members, a similar pair of spaced lower connecting frame members therefor, bracing and spacing means for the members of each pair and for corresponding members of opposite pairs, a divided axle having its outer extremities journaled in each end of said frame, a stub shaft rotatably mounted in said divided axle sections, a cylindrical gear carrier mounted on said shaft, beveled differential gears projecting laterally from said carrier, meshing gears for said beveled gears carried by each of said axle sections, a ring pivotally connected to said carrier by diametrically alined pins, a drive gear pivotally connected to said ring by similar diametric pins at right angles to the line of first said pins, said drive gear being inclosed by said upper and lower framing members to be maintained in longitudinal alinement thereby with said chassis in permitting said axles in common with said frame a horizontal and vertical independency of movement with respect thereto, and driving means for said drive gear.

In testimony whereof we affix our signatures in presence of two witnesses.

GEORGE GEER.
WESLEY GEER.

Witnesses:
HARRY WILCOX,
HERVY HOOULE.